(12) United States Patent
Heber et al.

(10) Patent No.: US 8,271,146 B2
(45) Date of Patent: Sep. 18, 2012

(54) MAXIMIZED BATTERY RUN-TIME IN A PARALLEL UPS SYSTEM

(75) Inventors: Brian P Heber, Delaware, OH (US); Kevin Eschhofen, Lewis Center, OH (US); Mohammad Nanda Marwali, Wilsonville, OR (US); Terry D Bush, Westerville, OH (US)

(73) Assignee: Liebert Corporation, Columbus, MO (US)

(*) Notice: Subject to any disclaimer, the term of this patent is extended or adjusted under 35 U.S.C. 154(b) by 174 days.

(21) Appl. No.: 12/630,107

(22) Filed: Dec. 3, 2009

(65) Prior Publication Data

US 2010/0082173 A1    Apr. 1, 2010

Related U.S. Application Data

(62) Division of application No. 11/427,701, filed on Jun. 29, 2006, now Pat. No. 7,668,624.

(60) Provisional application No. 60/595,446, filed on Jul. 6, 2005.

(51) Int. Cl.
    *G05D 11/00*    (2006.01)
(52) U.S. Cl. ......... 700/292; 700/286; 700/295; 700/298
(58) Field of Classification Search .............. 700/19–20, 700/24, 32, 286, 292, 295, 287, 291, 297, 700/298; 340/10.1, 10.4; 307/60–66; 713/300; 363/65
See application file for complete search history.

(56) References Cited

U.S. PATENT DOCUMENTS

| | | |
|---|---|---|
| 3,898,537 A | 8/1975 | Mayse et al. |
| 4,648,017 A | 3/1987 | Nerone |
| 4,727,469 A | 2/1988 | Kammiller |
| 4,782,241 A | 11/1988 | Baker et al. |
| 4,827,151 A | 5/1989 | Okado |
| 4,855,888 A | 8/1989 | Henze et al. |
| 4,864,483 A | 9/1989 | Divan |
| 4,962,462 A * | 10/1990 | Fekete ......................... 700/297 |
| 5,010,471 A | 4/1991 | Klaassens et al. |
| 5,025,545 A | 6/1991 | Brown |
| 5,184,280 A | 2/1993 | Fouad |

(Continued)

FOREIGN PATENT DOCUMENTS

| | | |
|---|---|---|
| JP | 11-098857 | 4/1999 |
| WO | 9750170 | 12/1997 |
| WO | 0129958 | 4/2001 |

OTHER PUBLICATIONS

Notification of First Office Action for Corresponding Chinese Application No. 200680024619X issued Dec. 26, 2008, State Intellectual Property Office of P.R.C.

(Continued)

*Primary Examiner* — Mohammad Ali
*Assistant Examiner* — Nathan Laughlin
(74) *Attorney, Agent, or Firm* — Locke Lord LLP

(57) ABSTRACT

An uninterruptible power supply (UPS) includes a plurality of UPS modules. Each of the UPS modules has a battery that provides power to a protected load in the event of a utility power failure. A plurality of controllers control how much power each of the batteries deliver to the protected load, and a communication bus allows the controllers to exchange information about the battery voltages. One of the controllers calculates the average battery voltage of the plurality of batteries and adjusts the amount of energy provided by an individual battery such that the battery voltage is about equal to the average battery voltage.

21 Claims, 1 Drawing Sheet

U.S. PATENT DOCUMENTS

| | | | |
|---|---|---|---|
| 5,185,705 | A | 2/1993 | Farrington |
| 5,254,878 | A | 10/1993 | Olsen |
| 5,406,269 | A | 4/1995 | Baran |
| 5,473,528 | A | 12/1995 | Hirata et al. |
| 5,745,356 | A | 4/1998 | Tassitino, Jr. et al. |
| 5,930,736 | A | 7/1999 | Miller et al. |
| 6,104,660 | A | 8/2000 | Moriya et al. |
| 6,111,387 | A | 8/2000 | Kouzu et al. |
| 6,172,432 | B1 | 1/2001 | Schnackenberg et al. |
| 6,274,950 | B1 | 8/2001 | Gottlieb et al. |
| 6,356,471 | B1 | 3/2002 | Fang |
| 6,362,540 | B1 | 3/2002 | Hill |
| 6,408,334 | B1 | 6/2002 | Bassman et al. |
| 6,487,356 | B1 | 11/2002 | Harrison et al. |
| 6,639,383 | B2 | 10/2003 | Nelson et al. |
| 7,425,779 | B2 * | 9/2008 | Luo et al. ............... 307/82 |
| 2002/0039302 | A1 | 4/2002 | Hanaoka et al. |
| 2003/0016548 | A1 | 1/2003 | Tassitino, Jr. et al. |
| 2003/0048006 | A1 | 3/2003 | Shelter et al. |
| 2003/0132949 | A1 | 7/2003 | Fallon et al. |
| 2006/0293798 | A1 | 12/2006 | Luo et al. |
| 2007/0219669 | A1 * | 9/2007 | Schaper et al. ............... 700/287 |

OTHER PUBLICATIONS

Braccini, Roberto, International Search Report for International Patent Application No. PCT/US2006/026019, Mar. 23, 2007, European Patent Office, Munich.

Braccini, Roberto, Written Opinion for International Patent Application No. PCT/US2006/026019, Mar. 23, 2007, European Patent Office, Munich.

El-Bakry, M., Aly, A., Shehata, S. and Khalil, H. "An UPS With Proper Crest Factor and Efficiency for Computer Loads." Energy Conversion Engineering Conference, Honolulu, Jul. 27, 1997, vol. 3, pp. 1726-1731.

Jung, S. and Tzou, Y. "Discrete Feedforward Sliding Mode Control of a PWM Inverter for Sinusoidal Output Waveform Synthesis." Power Electronics Specialists Conference, Taipei, Jun. 20-25, 1994, vol. 1, pp. 552-559.

Wall, R. and Hess, H. "Design and Microcontroller Implementation of a Three Phase SCR Power Converter." Journal of Circuits, Systems, and Computers, Jul. 26, 1996, vol. 6, No. 6, pp. 619-633, World Scientific Publishing Company.

Wong, C., Mohan, N. and He, J. "Adaptive Phase Control for Three Phase PWM AC-To-DC Converters with Constant Switching Frequency." Power Conversion Conference, Yokohama, Apr. 19-21, 1993, pp. 73-78.

Tzou, Y. and Wu, H. "Design and Implementation of a Multiprocessor-based Uninterruptible Power Supply." Power Electronics Specialists Conference, Kyoto, Apr. 11-14, 1988, vol. 2, pp. 650-657.

Martins, A., Carvalho, A. and Araujo, A. "A Control Method for High Power UPSs in Parallel Operation." Proceedings of the 38th Midwest Symposium on Circuits and Systems, Rio de Janeiro, Aug. 13-16, 1995, vol. 1, pp. 208-211.

* cited by examiner

MAXIMIZED BATTERY RUN-TIME IN A PARALLEL UPS SYSTEM

CROSS-REFERENCE TO RELATED APPLICATION

This application is a divisional application of Ser. No. 11/427,701, filed Jun. 29, 2006, now U.S. Pat. No. 7,668,624, which claimed priority to U.S. Provisional Patent Application No. 60/595,446, filed on Jul. 6, 2005, both of which are hereby incorporated by specific reference.

BACKGROUND

The present invention relates generally to uninterruptible power supplies ("UPS"), and more particularly, to methods and apparatus for maximizing the battery runtime in a parallel UPS system.

Uninterruptible power supplies are designed to provide continuous power to a critical load in the event of a temporary failure of utility power. In some systems, a plurality of UPS modules are connected together in parallel to supply the critical load. Each UPS module generally includes a rectifier, a battery, and an inverter. In the event of an interruption of utility power, the critical load will be supplied by DC power from the batteries in the UPS modules. This DC power is converted to AC power by the inverters on the UPS modules before being passed to the critical bus. One disadvantage of a system using parallel UPS modules is that the load is distributed evenly across each of the batteries in the UPS modules. There is no guarantee, however, that the batteries will have the same energy delivery capabilities. For example, one battery may be relatively new and able to deliver twice as much runtime as another battery that is relatively old. So the UPS with the "old" battery may terminate operation due to an earlier End of Discharge ("EOD") before the UPS with the new battery. In a system with multiple UPS modules, the module with the weakest battery may shut down first, followed by the next weakest, and so on. Each time a UPS module shuts down, the remaining modules experience an increased share of the load. This diminishes the runtime available for the remaining batteries and may overload the remaining UPS modules. The present application addresses these shortcomings and provides other advantages that will be apparent to those skilled in the art.

SUMMARY

One version of the invention relates to an uninterruptible power supply that has a plurality of batteries that provide power to a protected load in the event of a utility power failure. It includes a plurality of controllers that control how much power each of the plurality of batteries deliver to the protected load, and a communication bus that allows the controllers to exchange information about the battery voltages. At least one of the controllers calculates the average battery voltage of the plurality of batteries and adjusts the amount of energy provided by an individual battery such that the battery voltage is about equal to the average battery voltage. This system also works with UPS modules that have batteries of different types and with UPS modules that have different energy storage systems such as a flywheel. Other embodiments of the invention are set forth in the detailed description of the invention below.

BRIEF DESCRIPTION OF THE DRAWINGS

Other objects and advantages of the invention will become apparent upon reading the following detailed description and upon reference to the drawings in which.

Figure 1:
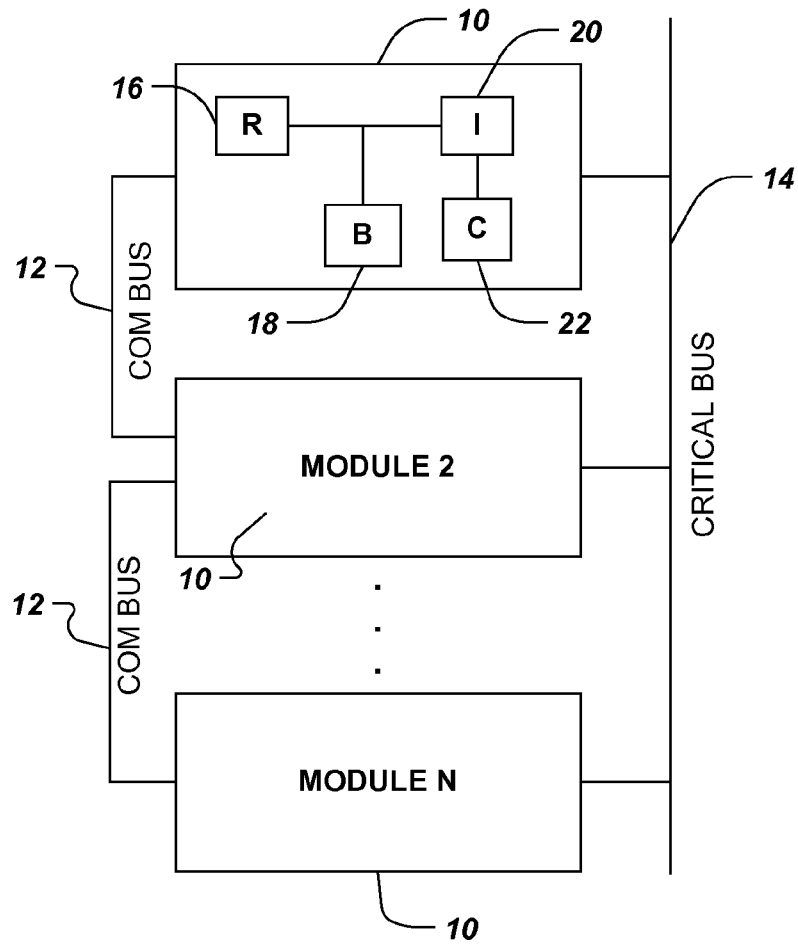
FIG. 1 is a schematic diagram of a parallel UPS system according to an embodiment of the invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 illustrates an uninterruptible power supply system according to an embodiment of the invention. The system includes a plurality of UPS modules 10. Each UPS module in this example has a rectifier 16, a battery 18, an inverter 20, and a controller 22. The rectifier 16 converts AC power received by the module 10 to DC power. The AC power received by the module 10 may come from utility power or other AC power sources such as generators. The inverter 20 converts the DC power to a regulated conditioned AC power. The battery 18 provides reserve DC power in the event there is a failure of the AC power source.

The UPS modules 10 are coupled to a communication bus 12. The communication bus 12 allows the UPS modules 10 to exchange information and commands necessary to operate the UPS modules, such as the battery voltage of each UPS module 10 in the system. The communication bus 12 is preferably a digital communication bus, such as a Control Area Network ("CAN") bus, but other conventional digital buses, such as Ethernet could be substituted as a matter of design choice. Alternatively, an analog bus could be substituted as a matter of design choice as long as the bus can be shared between the UPS modules 10 to facilitate load sharing and other parallel system operations.

The outputs of the UPS modules 10 are coupled to the critical bus 14. The critical bus 14 delivers power to the critical load (not shown). The critical load is any load that is intended to be protected from power interruptions, and typical examples include computer and medical equipment and the like. The UPS modules 10 may be coupled to the critical bus 14 by conventional means, such as a bypass static switch. The bypass static switch may be common, or each UPS module 10 may be provided with its own bypass static switch. In the event of an interruption of utility power, the critical load will be supplied by DC power from the batteries 18 in the UPS modules 10. This DC power is converted to AC power by the inverters 20 on the UPS modules 10 before being passed to the critical bus 14.

The controllers 22 in each UPS module adjust the load supplied by the module 10 to the critical bus 14. It is advantageous that the controllers 22 are PID controllers that include a feedback control loop, but other controllers may be substituted as a matter of design choice. The controllers 22 depicted in the embodiment shown in FIG. 1 are PID controllers that have been implemented in software on a microprocessor and use digital signal processing ("DSP") techniques.

According to one embodiment of the invention, the feedback control loop adjusts the load of each UPS module based on the average battery voltage. With reference to FIG. 1, the average battery voltage is given by the equation: $Vbatt\_average = (Vbatt\_1 + Vbatt\_2 + Vbatt\_3 \ldots + Vbatt\_n)/n$ where n is the number of modules on-line. The battery voltage of each battery is communicated over the CAN bus to the other UPS modules in the system. The average battery calculation can be made at a central processor and then passed over the CAN bus, or each UPS module can make the calculation individually.

Figure 2:
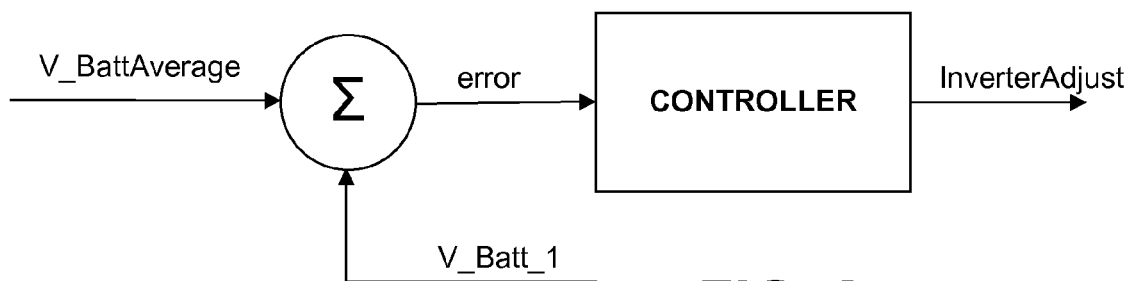
FIG. 2 is a schematic diagram of a control loop for adjusting the output of an inverter according to an embodiment of the invention.

According to one embodiment of the invention, the feedback loop, depicted in FIG. 2, will increase the load on an individual battery in a UPS module if the battery's voltage is greater than the average battery voltage and decrease the load if the battery voltage is less than the average battery voltage. As shown in FIG. 2, a signal representing the average battery voltage ("Vbatt_average") is summed with a signal representing the battery voltage of the battery in the particular UPS module. The result of the summation is provided as an error signal to the controller. The controller then sends a signal to the inverter to increase or decrease the amount of energy supplied by the battery in the UPS modules. If the critical bus is an AC bus, then the phase angle of the power supplied by the inverter is advanced with respect to the phase angle of the power on the critical bus to increase the load on the inverter and, hence, decrease the battery voltage relative to the average battery voltage. Conversely, the relative phase angle is decreased to lower the load on the inverter and raise the battery voltage. In this way, the load will be distributed across all the UPS modules that are on battery such that the battery voltage of each battery is adjusted to Vbatt_average, plus or minus a small amount of error that may be present in the control loops. Of course, the accuracy and speed of the control loops is a matter of design choice. Those of skill in the art will recognize that a similar control could be used in a system in which the critical bus is a DC bus, except, of course, that there is no phase angle to adjust and the output voltage of the inverter is adjusted so that it will provide more or less power depending on the battery voltage.

According to another embodiment of the invention, if one or more of the UPS modules looses utility power and switches to battery operation, the modules can coordinate together to handle the load in an efficient manner. In this embodiment, the UPS module (or modules) that is on battery power first reduces its share of the critical load to zero. By reducing the load to zero, the battery of the UPS module need only supply enough energy to make up for the inverter losses and, therefore, can run for an extended period of time. Reducing its share of the load to zero, however, could overload one or more of the inverters in the remaining UPS modules. The inverters, however, are typically designed to operated in an overload condition for a brief period of time, for example, ten minutes. A signal representing the overload condition is passed over the CAN bus to the module or modules that are on battery. The UPS module(s) will start to provide power to the critical load from its battery, increasing the amount of power provided until the remaining UPS modules are not overloaded.

According to another embodiment of the invention, the UPS modules may shift load between each other depending on the estimated battery runtime left for their various batteries balanced against the overload runtime. This embodiment is particularly advantageous if one (or more) UPS modules looses utility and operates from battery, and the battery runtime is less than the overload runtime of the remaining modules. Typically, inverters are as designed to run at 125% for 10 minutes. If, for example, a UPS module is within 10 minutes or less of its End of Discharge ("EOD"), then it may be advantageous to reduce the load on that UPS module and allow other modules in the system to temporarily operate in an overload condition, thus preserving battery life for as long as possible. Thus, for example, in a two module system, if the first UPS module is near EOD and has 50% load, then it could give up 25% to the second UPS module, that might have 100% for example, hence placing that module in overload. This would extend the battery run time and keep the critical load protected. Of course, this embodiment is operable with any number of UPS modules. In this case, the UPS module (or modules) that is on battery reduces the power it is supplying thus causing the remaining UPS modules to become overloaded. The control loop balances the estimated battery runtime with the overload runtime. Those of skill in the art will be familiar with methods for estimating the battery runtime, which will depend on the batteries being used and other factors unique to the specific implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Consequently, all such similar applications are considered within the scope and spirit of the invention. Accordingly, the protection sought herein is as set forth in the claims below.

What is claimed is:

1. A method of controlling battery voltages in each of a plurality of uninterruptible power supply (UPS) modules, comprising:
   reducing energy delivered from a first battery to a protected load to about zero;
   determining whether an inverter delivering power from a second battery to the protected load is overloaded;
   increasing the energy delivered from the first battery until the inverter is not overloaded;
   determining an overload runtime of the inverter;
   determining a battery runtime of the first battery; and
   if the battery runtime of the first battery is less than the overload runtime of the inverter, reducing the energy of the first battery such that the inverter is overloaded.

2. The method of claim 1, further comprising:
   determining a battery runtime of the second battery; and
   if no inverter is placed in overload by reducing the energy of the first battery, balancing the battery runtime of the first battery against the battery runtime of the second battery.

3. The method of claim 1, further comprising the step of balancing the battery runtime against the overload runtime of the inverter intentionally placed in the overload condition.

4. The method of claim 1, wherein the first battery is associated with one of the UPS modules that has lost utility power.

5. The method of claim 4, wherein the reducing step is triggered by the UPS module losing utility power.

6. A method of controlling an uninterruptible power supply comprising:
   determining an overload runtime of an inverter;
   determining a battery runtime of at least one battery delivering power to a protected load;
   if the battery runtime of the at least one battery is less than the overload runtime of the inverter, reducing the energy of the at least one battery such that the inverter is overloaded.

7. The method of claim 6, further including the step of balancing the battery runtime against the overload runtime of the inverter intentionally placed in the overload condition.

8. The method of claim 6, wherein the at least one battery is associated with a UPS module that has lost utility power.

9. The method of claim 8, wherein the determining steps are triggered by the UPS module losing utility power.

10. An uninterruptible power supply (UPS) system, comprising:
    a plurality of UPS modules, each UPS module including a battery that provides power to a protected load in the event of a utility power failure;
    a plurality of controllers that control how much power each of the batteries deliver to the protected load;
    a communication bus that allows the controllers to exchange information about the battery voltages;
    wherein at least one of the controllers is configured to:
        reduce the amount of power provided by a first battery to about zero and, if an overload condition is indicated on the communication bus, increase the power provided by the first battery until the overload condition is corrected;
    wherein the at least one controller is further configured to:
        determine an overload runtime of an inverter;
        determine a battery runtime of the first battery; and
        if the battery runtime of the first battery is less than the overload runtime of the inverter, reduce the power of the first battery such that the inverter is overloaded.

11. The system of claim 10, wherein the inverter delivers power through a second battery to the protected overload and wherein the at least one controller is further configured to—
    determine a battery runtime of the second battery; and
    if no inverter is placed in overload by reducing the energy of the first battery, balance the battery runtime of the first battery against the battery runtime of the second battery.

12. The system of claim 10, wherein the at least one controller is further configured to balance the battery runtime against the overload runtime of the inverter intentionally placed in the overload condition.

13. The system of claim 10, wherein the first battery is associated with one of the UPS modules that has lost utility power.

14. The system of claim 13, wherein the at least one controller is further configured to reduce the amount of power provided by the first battery in response to the UPS module losing utility power.

15. An uninterruptible power supply (UPS) system, comprising:
    a plurality of UPS modules, each UPS module including a battery that provides power to a protected load;
    a plurality of controllers that control how much power each of the batteries deliver to the protected load;
    a communication bus that allows the controllers to exchange information about battery voltages;
    wherein at least one of the controllers compares an estimated battery runtime of a first battery with an inverter overload runtime of an inverter and if the estimated battery runtime is less than the overload runtime reduces the power provided by the first battery to the protected load.

16. The system of claim 15, wherein the at least one controller further balances the battery runtime against the overload runtime of the inverter by intentionally placing the inverter in an overload condition.

17. The system of claim 15, wherein the first battery runtime is associated with a UPS module that has lost utility power.

18. The system of claim 17, wherein the controller compares the estimated battery runtime with the inverter overload runtime in response to the UPS module losing utility power.

19. A method of controlling battery voltages in each of a plurality of uninterruptible power supply (UPS) modules, comprising:
    reducing energy delivered from a first battery, through a first inverter of a first UPS module that has lost utility power, to a protected load to about zero;
    determining whether a second inverter, of a second UPS module, delivering power to the protected load is overloaded; and
    determining an overload runtime of the second inverter;
    determining a battery runtime of the first battery;
    balancing the battery runtime of the first battery against the overload runtime of the second inverter, including intentionally placing the second inverter in an overload condition.

20. The method of claim 6, further comprising:
    determining a battery runtime of a first battery and a second battery delivering power to the protected load; and
    if no inverter is placed in overload by reducing the energy of the first battery, balancing the battery runtime of the first battery against the battery runtime of the second battery.

21. The system of claim 16, wherein the inverter delivers power through a second battery to the protected overload and wherein the at least one controller is further configured to:
    determine a battery runtime of the second battery; and
    if no inverter is placed in an overload condition, balance the battery runtime of the first battery against the battery runtime of the second battery.

* * * * *